June 17, 1958      J. DICKSON      2,839,041
VALVE FOR INTERNAL COMBUSTION ENGINE
Filed Dec. 3, 1956
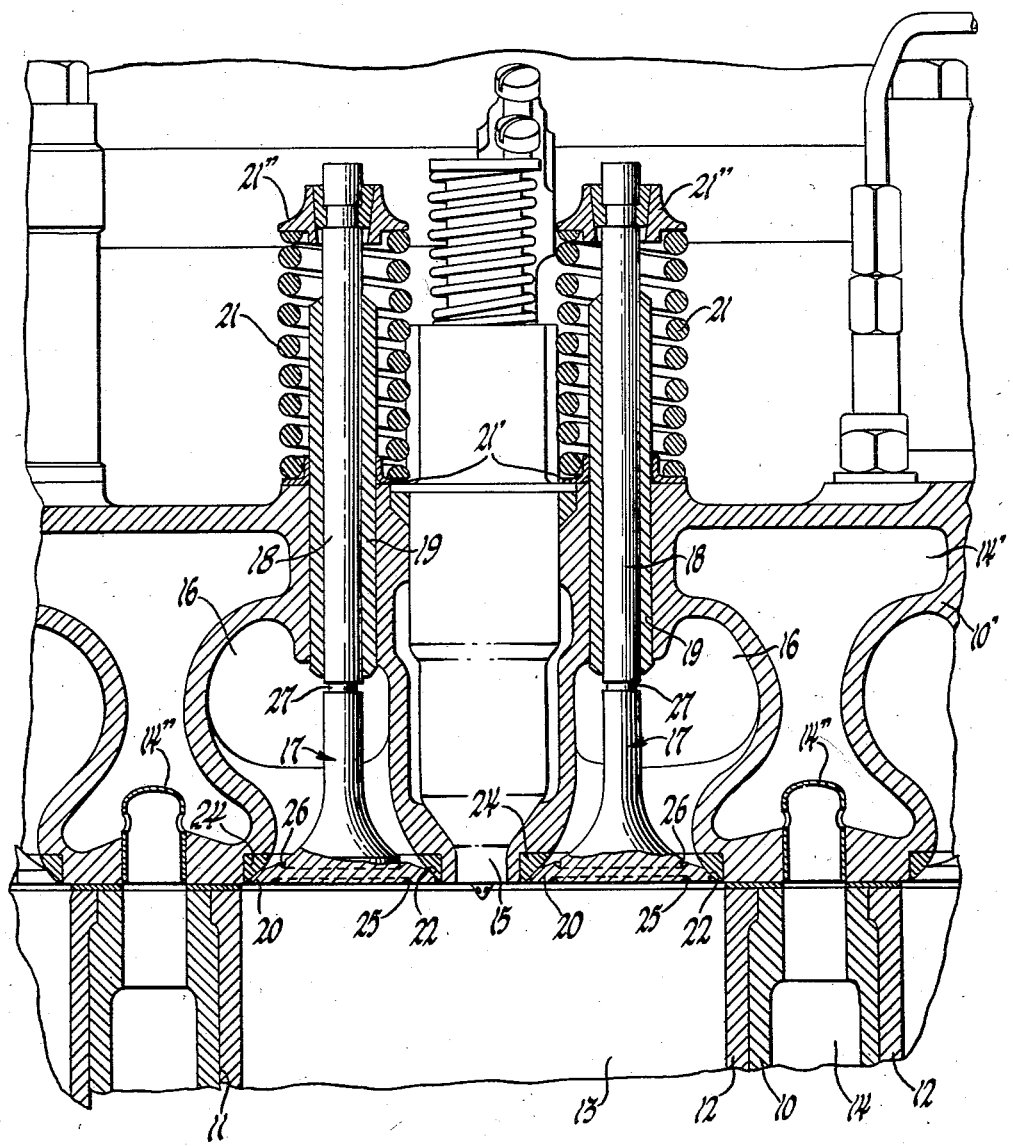
INVENTOR.
John Dickson
BY
ATTORNEY

United States Patent Office 2,839,041
Patented June 17, 1958

2,839,041

VALVE FOR INTERNAL COMBUSTION ENGINE

John Dickson, Bloomfield Hills, Mich., assignor to General Motors Corporation, Detroit, Mich., a corporation of Delaware Application December 3, 1956, Serial No. 625,660

7 Claims. (Cl. 123—188)

This invention relates to an internal combustion engine of the expansible combustion chamber type and more particularly to a valve for such an engine.

In internal combustion engines of the aforementioned type, the cyclic thermal conditions occurring within the several combustion chambers and manifold passages of the engine result in the cyclic expansion and contraction of the surfaces, and of the material immediately adjacent thereto, which are exposed either to the combustion or to the combustion by-products; the remainder of the engine being subjected to substantially steady state heat transfer conditions. As set forth in copending United States Patent 2,791,989, John Dickson, and entitled "Internal Combustion Engine," such cyclic surface expansion and contraction have been found to be a primary cause of cracking failures of such engine surfaces. Such cyclic expansion and contraction of the surfaces also result in the progressive and permanent warping or deflection and radial growth of the affected material. To compensate for the distortion which normally occurs in the various engine elements under operating conditions, it is generally necessary to design these elements with greater initial clearances than would otherwise be required. These increased clearances, although necessary, are generally detrimental to the engine operating efficiency.

The foregoing detrimental effects are particularly pronounced in the case of valves for such engines and this is particularly true of the exhaust valves for such engines. Consequently, for the purpose of illustration, the invention is described herein with reference to such an exhaust valve of the poppet type. However, the invention is believed to be equally applicable to other types of engine valves.

An exhaust valve of the poppet type comprises a valve member having a valve stem reciprocably mounted in a cylinder member and having a flared head portion formed integrally therewith and adapted to engage a cooperating valve seat carried by the cylinder member in timed relation to the engine operating cycle thereby controlling the flow of gaseous exhaust products from the combustion chamber.

When the valve member is in its closed position, the rim of the valve head is maintained in heat conducting, and normally sealing, contact with the valve seat carried by the associated cylinder member, while the combustion chamber face thereof is exposed to the cyclic thermal conditions occurring within the combustion chamber and the exhaust passage face thereof is exposed to the temperature within the exhaust manifold passages. Thus the rim of the valve is maintained at a substantially lower temperature than the remainder of the valve head by the relatively cooler valve seat. This causes the cyclic expansion and contraction of the combustion chamber face, and to a lesser extent of the exhaust passage face, to place this relatively cooler outer rim in cyclic tension which tends to result in the eventual radial fatiguing or cracking of the valve rim and in sunburst type cracking of the valve member adjacent to and including its valve seating surfaces.

The cyclic expansion and contraction of the valve face also tends to warp and ovalize the valve head out of contact with the valve seat and this further accentuates the thermal unbalance occurring within the valve head. Such warpage and ovalizing results in impacting of the contacting valve seat surfaces in "blow by" past the valve throughout the engine operating cycle. Such "blow by," in addition to reducing the overall operating efficiency of the engine, may also result in burning of the valve and in time may erode and accentuate the sunburst cracking of the mating sealing surfaces.

The valve stem of such an exhaust valve is subjected to both radial and axial growth in that portion extending across the exhaust passage. Normally such growth is not detrimental to engine operation being compensated for in the valve actuating mechanism. However, growth due to the axial elongation of the surface of this stem portion can in some instances result in sufficient radial upsetting of the surface metal of the substantially cooler valve stem portion within the valve guide bearing thereby causing the valve to stick.

This invention contemplates an improved valve member having a plurality of shallow grooves therein of a width and depth to accommodate the cyclic expansion and contraction of the aforementioned surfaces from relatively cooler surfaces thereof, thereby eliminating and minimizing valve cracking, distortion, growth, etc. which normally result in reduced engine operating characteristics.

The foregoing and other objects, advantages and features of the invention will be more thoroughly understood from the following description of a preferred embodiment thereof having reference to the single figure of the attached drawing which is a longitudinal, sectional view showing a portion of an internal combustion, fuel injection, compression ignition engine having exhaust valves constructed in accordance with the invention.

Referring more particularly to the drawing, the engine comprises a cylinder block 10 having at least one bore 11 therein mounting a cylinder liner 12 which is, in turn, adapted to reciprocably mount a piston, not shown. A cylinder head 10' is mounted on the cylinder block and is sealed with respect thereto and to the end of the cylinder liner 12 to form an expansible combustion chamber 13 with the reciprocating piston. The block and the head are suitably cored as indicated at 14 and 14' to provide cooling water passages which are interconnected by nozzles indicated at 14". A fuel injector 15 is mounted in the cylinder head centrally of the bore 11 and is adapted by a suitable and conventional actuating mechanism, not shown, to inject liquid or gaseous fuel charge into the combustion chamber in timed sequence to the engine operating cycle. The cylinder head is also cored to provide two exhaust passages 16 opening on the combustion chamber 13 diametrically of the injector nozzle and controllable by two poppet type exhaust valves indicated generally at 17.

Each of the poppet valve mechanisms 17 comprises a valve member having a stem 18 which is reciprocably mounted in a valve guide bearing 19 carried by the head 10'. The lower portion of the valve stem 18 projects downwardly into the exhaust passage 16 and is flared at its lower end to provide a valve head 20 operable to control the opening of the exhaust passage 16 into the combustion chamber. A spring 21 is compressibly interposed between a spring seat 21' on the cylinder head 10' and a spring seating washer 21" carried by the upward end of the valve stem 18 which projects upwardly of the guide bearing 19. The spring 21 serves as a return spring biasing the valve member toward its closed position in which a frusto conical surface 22 formed adjacent its outer periphery on the exhaust passage side of the valve head cooperates with a similar seat formed on a valve seat insert 24 carried by the cylinder head. It will be noted that the nozzles 14" are adapted to direct the relatively cool water entering the cylinder head from the cylinder block on that portion of the cylinder head carrying the valve seat inserts 24 and forming the exhaust passage openings onto the combustion chamber.

In accordance with the invention, the combustion chamber face of the valve head 20 is provided with an annular groove 25 immediately adjacent its outer periphery. The opposite or exhaust passage face of the valve head 20 is also provided with an annular groove 26 radially inwardly from and immediately adjacent the frusto conical seating surface 22. The grooves 25 and 26 are limited substantially to the depth to which the adjacent surfaces of the valve are subjected to cyclic expansion and contraction and to a width accommodating and isolating such expansion and contraction of the combustion chamber and exhaust passage surface layer portions from the relatively cooler surfaces of the valve head rim.

A circumferential groove 27 is also formed in the valve stem immediately adjacent the end of the valve stem guide bearing 19. The groove 27 accommodates and isolates the axial expansion of the surface portion of the valve stem portion projecting into the exhaust passage from the relatively cooler surface portion within the valve guide bearing. While the groove 27 in the embodiment shown is exposed to the exhaust passage 16, this groove may be so located that it is shielded by the valve guide bearing in both its opened and closed positions.

While only one specific embodiment of the invention has been disclosed for the purposes of illustration, it will be obvious to those skilled in the art that various modifications may be made therein without departing from the spirit and scope of the invention, as defined in the following claims.

I claim:

1. A poppet valve for an internal combustion engine comprising a valve stem adapted to reciprocably mount said valve member in said engine and a flared valve head adapted to control the flow of gases through a passage opening on a combustion chamber within said engine, said valve head having a first surface thereon opposite said valve stem and facing said combustion chamber, a second surface thereon facing said gas passage and a peripheral portion having a surface thereon intermediate said first and second surfaces and adapted to sealingly engage a valve seating surface carried by said engine and defining the opening of said passage on said combustion chamber, and said valve head having a first annular groove opening on said first surface and a second annular groove opening on said second surface, said first and second grooves being formed adjacent the peripheral portion of said valve head and being of a depth and width to isolate cyclic expansion and contraction of said first and second surfaces due to engine operating thermal conditions imposed thereon from said peripheral portion and surface.

2. A poppet valve as set forth in claim 1 having a third annular groove formed circumferentially of said valve stem adjacent its mounting in said engine, said third groove terminating said second surface and being of a depth and width to isolate cyclic expansion and contraction of said second surface and of the portion of said stem projecting into said passage from the portion of said stem mounting said valve in said engine.

3. In a valve mechanism for an internal combustion engine, a valve member having a surface thereon facing a combustion chamber within said engine and having a peripheral portion thereon adapted to sealingly engage a seating surface terminating a passage opening on said combustion chamber, and said valve member having an annular groove opening toward and adjacent the periphery of said combustion-chamber-facing surface, said groove being limited substantially to the depth said member is subjected to cyclic expansion and contraction adjacent said first-mentioned surface by the cyclic thermal conditions occurring within said combustion chamber and to a width isolating such cyclic expansion from said peripheral portion.

4. In an internal combustion engine including a cylinder closed at one end to form an expansible combustion chamber with a piston reciprocably mounted therein, means associated with said cylinder and adapted to cool said closed end, a passage in said cylinder opening on said combustion chamber, and valve means operable to control the gaseous flow through said passage, said valve means including a valve seat carried by said cylinder and defining the opening of said passage into said combustion chamber and a valve member having a stem portion reciprocably mounted in said cylinder and a flared head having a peripheral surface thereon adapted to sealingly engage said valve seat, said valve head having a first surface thereon facing said combustion chamber and a second face thereon facing said passage and co-extensive with a portion of said valve stem projecting into said passage, said valve head having a first annular groove therein opening on said first surface adjacent said peripheral surface and a second annular groove therein opening on said second surface adjacent said peripheral surface, said first and second grooves being limited substantially to the respective depths to which said first and second surfaces of said member are subjected to cyclic expansion and contraction due to the thermal operating conditions within said combustion chamber and passage and to a width accommodating and isolating such expansion and contraction from the peripheral portion of said valve head.

5. In an internal combustion engine as set forth in claim 4, said valve member having a third annual groove formed circumferentially of said valve stem portion immediately adjacent the projection of said valve member into said passage means, said third groove terminating said second surface and being of a depth and width to isolate cyclic expansion and contraction of said second surface and of the portion of said stem projecting into said passage from the portion of said stem mounting said valve in said engine cylinder.

6. A poppet valve for an internal combustion engine comprising a stem portion adapted to reciprocably mount said valve member in said engine and a flared head adapted to control the flow of gases through a passage opening on a combustion chamber within said engine, said head having a first surface thereon facing said combustion chamber, a second surface thereon facing said gas passage and a peripheral portion having a surface thereon intermediate said first and second surfaces and adapted to sealingly engage a valve seating surface defining the opening of said passage on said combustion chamber, and said valve head having a first annular groove opening on said second surface adjacent the peripheral portion, a second annular groove formed circumferentially of said valve stem adjacent its mounting in said engine, said first and second grooves substantially defining said second surface and being of a depth and width to isolate cyclic expansion and contraction of said second surface due to engine operating thermal conditions imposed thereon from said peripheral and stem portions.

7. A poppet valve for an internal combustion engine comprising a stem portion adapted to reciprocably mount said valve member in said engine and a flared head adapted to control the flow of gases through a passage opening on a combustion chamber within said engine, said head having a first surface thereon facing said combustion chamber, a second surface thereon facing said gas passage and a peripheral portion having a surface thereon intermediate said first and second surfaces and adapted to sealingly engage a valve seating surface defining the opening of said passage on said combustion chamber, and said valve head having an annular groove opening on said second surface adjacent said peripheral portion and being of a depth and width to isolate cyclic expansion and contraction of said second surface due to engine operating thermal conditions imposed thereon from said peripheral portion.

References Cited in the file of this patent

UNITED STATES PATENTS

| | | |
|---|---|---|
| 1,578,191 | Devos et al. | Mar. 23, 1926 |
| 2,153,284 | Steiner | Apr. 4, 1939 |
| 2,396,392 | Schreck | Mar. 12, 1946 |

FOREIGN PATENTS

| | | |
|---|---|---|
| 600,911 | France | Nov. 21, 1925 |
| 788,537 | France | July 29, 1935 |